(12) United States Patent
Kim et al.

(10) Patent No.: US 7,852,641 B2
(45) Date of Patent: Dec. 14, 2010

(54) POWER SUPPLY APPARATUS HAVING MULTIPLE OUTPUTS

(75) Inventors: Jin-ha Kim, Seongnam-si (KR); Joong-gi Kwon, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 292 days.

(21) Appl. No.: 11/953,154

(22) Filed: Dec. 10, 2007

(65) Prior Publication Data
US 2008/0266910 A1 Oct. 30, 2008

(30) Foreign Application Priority Data
Apr. 30, 2007 (KR) .................... 10-2007-0042191

(51) Int. Cl.
*H02M 3/335* (2006.01)
*G05F 1/577* (2006.01)
(52) U.S. Cl. ............... 363/21.14; 363/21.15; 323/267
(58) Field of Classification Search ............ 323/267, 323/268; 363/20, 21.1, 21.04, 21.06, 21.12, 363/21.14, 21.17, 21.18, 970, 97, 127; 307/11, 307/17, 31, 33
See application file for complete search history.

(56) References Cited

U.S. PATENT DOCUMENTS

| | | | | |
|---|---|---|---|---|
| 6,069,804 A | * | 5/2000 | Ingman et al. ........... 363/21.14 |
| 6,330,169 B2 | * | 12/2001 | Mullett et al. ................ 363/16 |
| 6,845,018 B2 | * | 1/2005 | Ohishi ..................... 363/21.06 |
| 6,950,950 B2 | * | 9/2005 | Sawyers et al. ............. 713/300 |
| 7,515,442 B2 | * | 4/2009 | Mikulenka et al. ....... 363/21.12 |
| 2004/0046536 A1 | * | 3/2004 | Librizzi ..................... 323/288 |

* cited by examiner

*Primary Examiner*—Gary L Laxton
(74) *Attorney, Agent, or Firm*—Staas & Halsey LLP

(57) ABSTRACT

A power supply apparatus having multiple outputs, a transformer, a first output circuit generating a first output voltage with respect to power transferred to a secondary side of the transformer, and a first output controller generating a first control signal to control a power supply provided to a primary side of the transformer, the apparatus including: a second output circuit to generate a second output voltage with respect to the power transferred to the secondary side of the transformer; and a second output controller to control an output of the second output voltage, wherein the second output circuit includes a second switch performing a switching operation on current flows of the second output circuit, and the second output controller controls the switching operation of the second switch by turning off the second switch or feeding the second output voltage back to the second switch according to the first control signal.

21 Claims, 9 Drawing Sheets

POWER SUPPLY APPARATUS HAVING MULTIPLE OUTPUTS

CROSS-REFERENCE TO RELATED APPLICATION

This application claims all benefits accruing under 35 U.S.C. §119 from Korean Patent Application No. 2007-42191, filed on Apr. 30, 2007 in the Korean Intellectual Property Office, the disclosure of which is incorporated herein by reference.

BACKGROUND OF THE INVENTION

1. Field of the Invention

Aspects of the present invention relate to a power supply apparatus having multiple outputs, and more particularly, to a power supply apparatus having multiple outputs capable of individually controlling multiple output voltages using a simple structure.

2. Description of the Related Art

In general, apparatuses such as a computer, an image forming apparatus (such as a printer or a copier), a monitor, or a communication terminal, require an efficient power supply system that has a simple structure and a small size to provide a stable power supply. A current source type power supply apparatus has been widely used as an efficient power supply system.

FIG. 1 is a circuit diagram explaining basic operations of the current source type power supply apparatus. A circuit as illustrated in FIG. 1 is known as a flyback converter and is a type of DC/DC converter.

Referring to FIG. 1, the current source type power supply apparatus includes a transformer T having a predetermined turns ratio, a primary circuit 10 connected to a primary coil of the transformer T (i.e., connected to an input-side coil), and a secondary circuit 20 connected to a secondary coil of the transformer T (i.e., connected to an output-side coil). Here, the primary circuit 10 and the secondary circuit 20 can be insulated from each other by the transformer T.

The primary circuit 10 includes a control switch S connected in series between the primary coil of the transformer T and a grounding terminal. Here, the control switch S performs a switching operation on an input voltage in response to a control signal applied from an output voltage controller 30 in order to control an energy charging operation or a transferring operation of the transformer T.

The secondary circuit 20 includes a rectifier 21 to rectify currents transmitted from the transformer T. The rectifier 21 includes a diode D connected to the secondary coil of the transformer T and a capacitor C. Here, output terminals are provided at both end portions of the capacitor C. Therefore, an external load can be connected in parallel to both end portions of the capacitor C. In addition, although not shown in FIG. 1, the secondary circuit 20 may further include a filter to filter high frequency noise and electromagnetic interference (EMI) and an output voltage control circuit.

When the control switch S included in the primary circuit 10 is turned on, a voltage having an opposite polarity to that of the primary coil is induced in the secondary coil of the transformer T, so that the diode D of the rectifier 21 is in a reverse bias state. Therefore, a current flow to the secondary circuit 20 is blocked. Simultaneously, a magnetic inductance of the transformer T is charged with energy. More specifically, when the control switch S is in the "ON" state, current transfer by the transformer T does not occur and energy supplied to the primary coil is charged to the magnetic inductance of the transformer T.

On the other hand, when the control switch S is turned off, a voltage having an opposite polarity to a voltage in the "ON" state is induced in the secondary coil of the transformer T, so that the diode D of the secondary circuit 20 is in the "ON" state. Therefore, currents of the magnetic inductance with which the transformer T is charged are transmitted to the secondary circuit 20, and a DC voltage rectified by the rectifier 21 is output to the output terminal.

The output terminal of the secondary circuit 20 is connected to an output voltage controller 30. The output voltage controller 30 feeds an output voltage of the secondary circuit 20 back to the control switch S to apply a control signal to the control switch S. Here, the control signal is a signal to control a duty rate of the control switch S. Therefore, by controlling operations of the control switch S, the output voltage can be controlled.

As described above, when the control switch S included in the primary circuit 1 is turned on in the current source type power supply apparatus 20, magnetic inductance components of the transformer T are used as a boost inductor to charge the magnetic inductance of the transformer T. Conversely, magnetic inductance components of the transformer T are used to supply a DC output voltage that is rectified while currents of the magnetic inductance charged when the control switch S is turned off are transmitted to the secondary coil of the transformer T.

Therefore, the transformer T is used as a current source for the secondary circuit 20 that periodically supplies currents. As a result, the power supply apparatus utilizing such principles as shown in FIG. 1 is known as a current source type power supply apparatus. In addition to the aforementioned flyback converter, the current source type power supply apparatus may be of various types according to an additional circuit configuration of the primary circuit.

As compared with other types of power supply apparatuses, the rectifier of the secondary circuit of the current source type power supply apparatus has a simple structure and has a small number of components. Accordingly, the secondary circuit may be advantageous for the current source type power supply apparatus to use a multiple output structure. More specifically, for multiple outputs, a secondary circuit corresponding to each output has to be provided so that the simple structure of the secondary circuit may cause a decrease in the size of the entire apparatus. Due to this advantage, various types of current source type power supply apparatuses having multiple outputs have been introduced.

However, the conventional current source type power supply apparatuses having multiple outputs use multiple transformers, and include multiple regulator chips that may cause heavy losses in order to control a voltage output from each secondary circuit, or have complex structures in which an output voltage feedback circuit of each secondary circuit is connected to the primary circuit. As a result, the aforementioned advantage of the current source type power supply apparatus cannot be effectively applied.

SUMMARY OF THE INVENTION

Aspects of the present invention provide a power supply apparatus having multiple outputs capable of having a plurality of output circuits in the secondary side of a transformer, individually controlling an output voltage of each output circuit, increasing efficiency by reducing power losses, and having a simple configuration.

Additional aspects and/or advantages of the invention will be set forth in part in the description which follows and, in part, will be obvious from the description, or may be learned by practice of the invention.

According to an aspect of the present invention, there is provided a power supply apparatus having multiple outputs, a transformer, a first output circuit generating a first output voltage with respect to a power transferred to a secondary side of the transformer, and a first output controller generating a first control signal to control a power supply provided to a primary side of the transformer, the apparatus including: a second output circuit to generate a second output voltage with respect to the power transferred to the secondary side of the transformer; and a second output controller to control an output of the second output voltage, wherein the second output circuit includes a second switch to perform a switching operation on current flows of the second output circuit, and the second output controller controls the switching operation of the second switch by turning off the second switch or feeding the second output voltage back to the second switch according to the first control signal.

The second output controller of the apparatus may turn off the second switch in response to an externally applied second control signal.

The second output circuit may include a capacitor connected to the second switch, wherein the second switch is connected in series to the secondary side of the transformer, and one or more output terminals to output the second output voltage are formed at one or more end portions of the capacitor.

The second switch may include a metal-oxide-semiconductor field-effect transistor (MOSFET) having a gate terminal connected to an output terminal of the second output controller.

The second switch may include a bipolar junction transistor (BJT).

The second output controller may include: an output voltage detector to detect the second output voltage; an error detector to compare the second output voltage detected by the output voltage detector with a predetermined reference voltage and to output an error value according to a result of the comparing; and a pulse width modulator to output a switching control signal to control the switching operation of the second switch according to the first control signal.

The pulse width modulator may output the switching control signal to control the second switch in response to an externally applied second control signal.

The output voltage detector may be a voltage divider circuit.

The reference voltage may be generated by a resistor or a zener diode connected between a predetermined voltage source and a grounding terminal.

The second output controller may further include a compensation circuit unit which provides a compensation circuit using negative feedback, wherein the compensation circuit unit is connected in parallel to an output terminal of the error detector and an input terminal of the error detector applied with the second output voltage and may include a resistor and a capacitor that are connected in series.

A primary circuit of the transformer may include a current source type switching circuit unit including a first switch to perform a switching operation in response to the first control signal.

The current source type switching circuit unit may be one of a flyback, active-clamp flyback, half-bridge flyback, and series-resonant type.

The current source type switching circuit may further include a snubber circuit to prevent leakage inductance of the transformer.

The first output circuit may include a rectifier to rectify a power transferred from the transformer.

The rectifier may be one of a half-wave rectifying circuit and a full-wave rectifying circuit.

According to another aspect of the present invention, there is provided a power supply apparatus having a transformer and individually controlling multiple output voltages, the apparatus including: a primary circuit disposed on a primary side of the transformer to perform one of an energy charging operation and a transferring operation, which transfers power to a secondary side of the transformer, in response to a first control signal; a first output circuit disposed on the secondary side of the transformer to generate a first output voltage with respect to the power transferred to the secondary side of the transformer; a second output circuit disposed on the secondary side of the transformer to generate a second output voltage with respect to the power transferred to the secondary side of the transformer; a first output controller to generate the first control signal and to feed the first output voltage back to the primary side of the transformer in order to apply the first control signal to the primary circuit; and a second output controller to control an output of the second output voltage according to the first control signal. In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
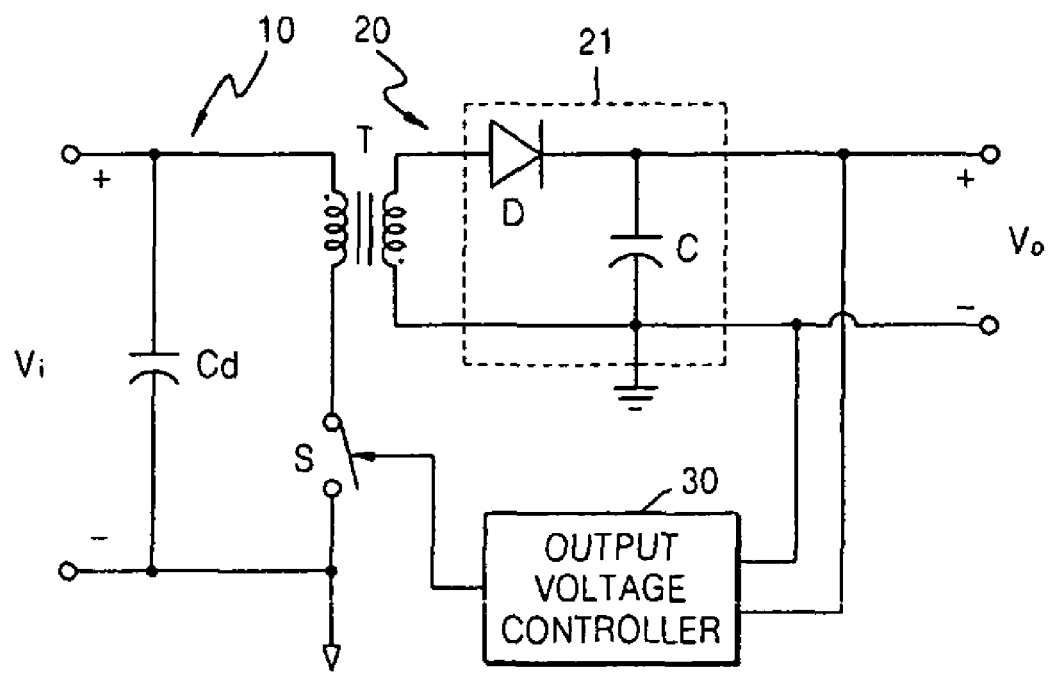
FIG. 1 is a circuit diagram explaining basic operations of a conventional current source type power supply apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
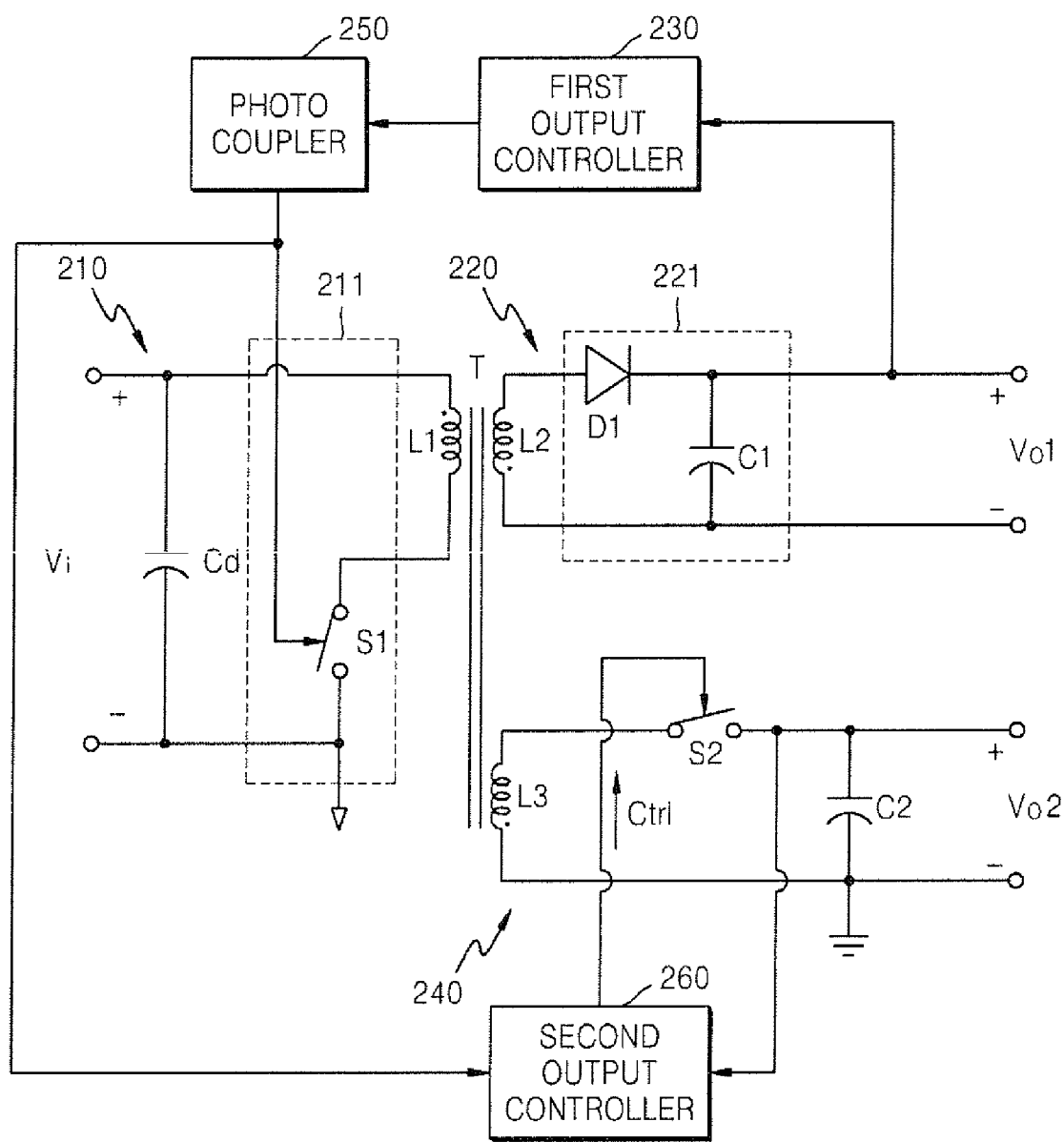
FIG. 2 is a circuit diagram explaining a power supply apparatus having multiple outputs according to an example embodiment of the present invention.

FIG. 2 is a circuit diagram explaining a power supply apparatus having multiple outputs according to an example embodiment of the present invention. According to the example embodiment of the present invention, the power supply apparatus includes two outputs. However, it is understood that according to aspects of the present invention, the power supply apparatus may be constructed to output N number of output voltages, where N is a natural number. When the number of outputs is N, a transformer includes N number of secondary coils, such that each of the N number of secondary coils may be connected to each secondary output circuit.

As illustrated in FIG. 2, the power supply apparatus having multiple outputs includes a transformer T having a primary coil L1 and two secondary coils (i.e., a first coil L2 and a second coil L3). Furthermore, each secondary coil L2 and L3 has a predetermined turns ratio to the primary coil L1.

The primary coil L1 is connected to a primary circuit 210, the first coil L2 in the secondary side is connected to a first output circuit 220, and the second coil L3 in the secondary side is connected to a second output circuit 240. Here, the primary circuit 210 is insulated from the first output circuit 220 and the second output circuit 240 in the secondary side by the transformer T.

The primary circuit 210 includes a current source type switching circuit unit 211 connected to the primary coil L1 of the transformer T. In this case, the current source type switching circuit unit 211 performs a switching operation in response to a first control signal applied from a first output controller 230 to control an energy charging operation or a transferring operation of the transformer T. The first control signal may be applied to the current source type switching circuit unit 211 through a photo coupler 250. The photo coupler 250 insulates the primary circuit 210 from the first output circuit 220 in the secondary side and includes a light emitting element and a light receiving element. The light emitting element may be a light emitting diode (LED), and the light receiving element may be a photo transistor.

The current source type switching circuit unit 211 may include a first switch S1 connected between the primary coil L1 of the transformer T and a grounding terminal. When the first switch S1 is turned on, the secondary coils L2 and L3 of the transformer T are induced with a voltage having an opposite polarity to that of the primary coil L1. Accordingly, a diode D1 included in the first output circuit 220 is in a reverse bias state, and a current flow to the first output circuit 220 is blocked.

The first output controller 230 controls a power supply provided in the primary side of the transformer T according to a first output voltage generated by the first output circuit 220. The first output controller 230 feeds the first output voltage Vo1 back to the first switch S1 in order to apply the first control signal to the first switch S1. Here, the first control signal may control a duty rate of the first switch S1.

When the first control signal transmitted from the first output controller 230 corresponds to an ON state of the first switch S1, the second output controller 260 generates a switching control signal Ctrl to turn off a second switch S2 in order to apply the switching control signal Ctrl to the second switch S2. Therefore, when the first switch S1 is turned on, a current flow to the second output circuit 240 is blocked.

As described above, when the first switch S1 is turned on, current flows to the secondary output circuits 220 and 240 are blocked and, simultaneously, a magnetic inductance of the transformer T is charged with energy. Specifically, when the first switch S1 is in the ON state, the transformer T does not perform a current transfer and the magnetic inductance of the transformer T is charged with the energy supplied to the primary coil L1.

On the contrary, when the first switch S1 is turned off, the secondary coils of the transformer T are induced with a voltage having an opposite polarity to that of when the first switch S1 is in the ON state. Accordingly, the diode D1 of the first output circuit 220 is in the ON state so that a magnetic inductance current with which the transformer T is charged is transferred to the first output circuit 220.

The first output circuit 220 rectifies a power transmitted to the secondary side of the transformer T to generate the first output voltage Vo1. In order to do this, the first output circuit 220 includes a rectifier 221 to rectify the power. The rectifier 221 may include a capacitor C1 and the diode D1 connected in series to the first coil L2 in the secondary side of the transformer T. Moreover, first output terminals for the first output voltage Vo1 may be provided at both end portions of the capacitor C1. The rectifier 221 illustrated in FIG. 2 is a half-wave rectifier. However, it is understood that the first output circuit 220 according to other aspects may employ a full-wave rectifier.

The second output circuit 240 rectifies currents transmitted from the transformer T to generate a second output voltage Vo2. In order to do this, the second output circuit 140 includes a second capacitor C2 and the second switch S2 to perform a switching operation in response to a switching control signal Ctrl applied by the second output controller 260.

As described above, when the first control signal transmitted from the first output controller 230 corresponds to the ON state of the first switch S1, the second output controller 260 generates and applies a switching control signal Ctrl to turn off the second switch S2. However, when the first switch S1 is turned off (i.e., when the first control signal transmitted from the first output controller 230 corresponds to turning off the first switch S1), the second output controller 260 feeds the second output voltage Vo2 back to generate the switching control signal Ctrl. The switching control signal Ctrl controls the second switch S2 such that the second output controller 260 can individually control the second output source voltage Vo2 when the second output controller 260 applies the switching control signal Ctrl to the second switch S2.

The second switch S2 may be implemented as a metal-oxide-semiconductor field-effect transistor (MOSFET) having a gate terminal connected to an output terminal of the second output controller 160 or as a bipolar junction transistor (BJT). When the MOSFET is employed, the second switch S2 receives the switching control signal Ctrl through the gate terminal and performs the switching operation.

As described above, when the first control signal corresponds to the ON state of the first switch S1 (i.e., when the first switch S1 is turned on), energy supplied to the primary coil L1 is charged to the magnetic inductance of the transformer T, and a voltage having an opposite polarity to that of the primary coil is induced in the secondary coil L3. Furthermore, when the first switch S1 is turned on, the second switch S2 is turned off so that currents transmitted from the transformer T are rectified so as to generate the second output voltage Vo2. In addition, when the first switch S1 is turned off and a voltage having an opposite polarity to that of the ON state is induced, the second switch S2 is controlled by the switching control signal Ctrl generated by performing the feedback process on the second output source voltage Vo2. Accordingly, the second output source voltage Vo2 can be individually controlled.

In addition, the second output controller 260 of the power supply apparatus having multiple outputs receives the second control signal corresponding to the power-off of the second output voltage and may generate the switching control signal Ctrl to turn off the second switch S2 in response to the second control signal. Here, when a system including the power supply apparatus having multiple outputs (for example, an image forming apparatus) is required to be in a sleep mode or a standby mode, the second control signal may be input from a central processing unit (CPU) for controlling operations of the image forming apparatus. When it is assumed that the second output circuit 240 supplies a main power and the first output circuit 220 supplies an auxiliary power, this construction may be used as a unit to turn off the main power in the sleep mode of the image forming apparatus. As described above, in the sleep mode, power is not consumed in the output circuit for supplying the main power by turning off the switch included in the output circuit for supplying the main power. As a result, power consumed in the entire system can be reduced.

According to the example embodiment, when the first control signal transmitted from the first output controller 230 corresponds to the ON state of the first switch S1, the second output controller 260 generates the switching control signal Ctrl to turn off the second switch S2. Furthermore, when the first control signal transmitted from the first output controller 230 corresponds to turning off the first switch S1, the second output controller 260 feeds the second output voltage Vo2 back to generate the switching control signal Ctrl to control the second switch S2. However, it is understood that according to a type of a current source type circuit unit included in the primary circuit 210, the switching control signal Ctrl generated by the second output controller 230 based on the first control signal transmitted from the first output controller 230 may be changed.

More specifically, when energy is supplied to the primary coil L1 according to the first control signal transmitted from the first output controller 230 and reverse bias is correspondingly applied to the second switch S2, the switching control signal Ctrl is generated so as to turn off the second switch S2. As a result, energy supplied to the primary coil L1 is blocked according to the first control signal transmitted from the first output controller 230, bias is correspondingly applied to the second switch S2, and the second output source voltage Vo2 is fed back to generate the switching control signal Ctrl to control the second switch S2.

According to aspects of the present invention, the second switch S2 may be replaced with a diode or a switch connected in series to the diode, the diode and the second capacitor C2 may rectify a power transferred from the transformer T, and the switch control the second output voltage Vo2. However, in this case, power losses occur due to a voltage drop of the diode, and efficiency of the entire power circuit can be degraded. In addition, costs increase due to the added diode.

According to the example embodiment, the diode is not used and the switching operation of the second switch S2 is controlled according to the switching control signal of the second output controller 260 (as described above). Accordingly, currents transmitted from the transformer T can be rectified and the second output voltage Vo2 can be, simultaneously, individually controlled. Therefore, power losses in the second output circuit 240 are reduced, efficiency is increased, a simple circuit structure can be implemented, and costs can be reduced.

Figure 3:
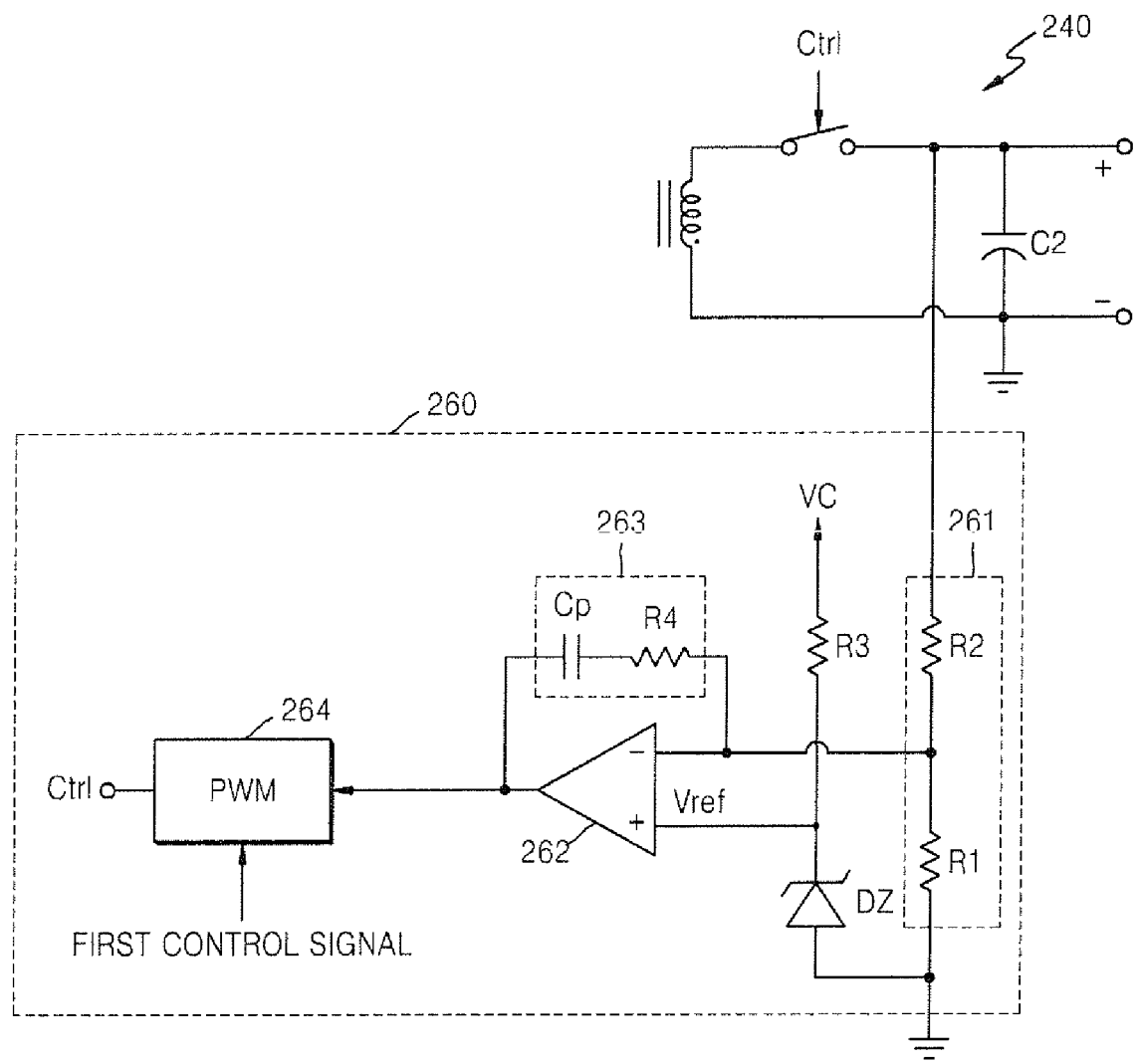
FIG. 3 is a circuit diagram of a second output controller shown in FIG. 2.

FIG. 3 is a circuit diagram of a second output controller 260 shown in FIG. 2. Referring to FIG. 3, the second output controller 260 includes an output voltage detector 261, an error detector 262, a compensation circuit unit 263, and a pulse width modulator (PWM) 264.

The output voltage detector 261 detects the second output voltage Vo2 as a predetermined voltage ratio so as to be provided to the error detector 262. The output voltage detector 261 may include two resistors connected to an output terminal (i.e., the output voltage detector 261 may be constructed as a voltage divider circuit having a first resistor R1 and a second resistor R2).

The error detector 262 compares a detection voltage provided from the output voltage detector 261 with a predetermined reference voltage Vref, amplifies an error value thereof, and outputs the error value. The error detector 262 may be a comparator.

The predetermined reference voltage Vref (for example, a voltage of 2.5 V) is input to a first input terminal of the error detector 262. Here, the reference voltage Vref may be generated by a third resistor R3 and a zener diode DZ connected between a voltage source Vc and a grounding terminal. In addition, the detection power provided from the output voltage detector 261 is input to a second input terminal of the error detector 262.

The compensation circuit unit 263 provides a compensation circuit using negative feedback to stabilize a circuit of the second output controller 260. The compensation circuit unit 263 is connected in parallel to the output terminal of the error detector 262 and the second input terminal and may include a fourth resistor R4 and a capacitor Cp that are connected in series.

The PWM 264 generates the switching control signal Ctrl to selectively turn off the second switch S2 based on the first control signal transmitted from the first output controller or generates the switching control signal Ctrl to control the second switch S2 to be turned on or off according to an output signal of the error detector 262. The PWM 264 applies the generated signal Ctrl to the second switch S2. For example, when the first control signal corresponds to the ON state of the first switch S1, the PWM 265 generates the switching control signal Ctrl to turn off the second switch S2. Alternatively, when the first control signal represents the OFF state of the first switch S1, the PWM 265 generates the switching control signal Ctrl to control the ON or OFF state of the second switch S2 according to the output signal of the error detector 262.

When the switching control signal Ctrl to control the ON or OFF state of the second switch S2 is generated according to the output signal of the error detector 262, widths of the ON interval and the OFF interval of the switching control signal Ctrl are controlled by an error value provided from the error detector 262. As described above, the second output voltage Vo2 is fed back, and the ON state of current flowing through the second switch S2 is controlled according to a magnitude of the second output voltage Vo2. As a result, the amount of current provided to a second output circuit terminal can be controlled and a magnitude of the second output voltage Vo2 can be controlled to have a desired value.

As described above, when the second output controller 260 of the power supply apparatus having multiple outputs receives the second control signal corresponding to the OFF state of the second output voltage, the PWM 264 generates the switching control signal Ctrl to turn off the second switch S2 in response to the second control signal.

Figure 4:
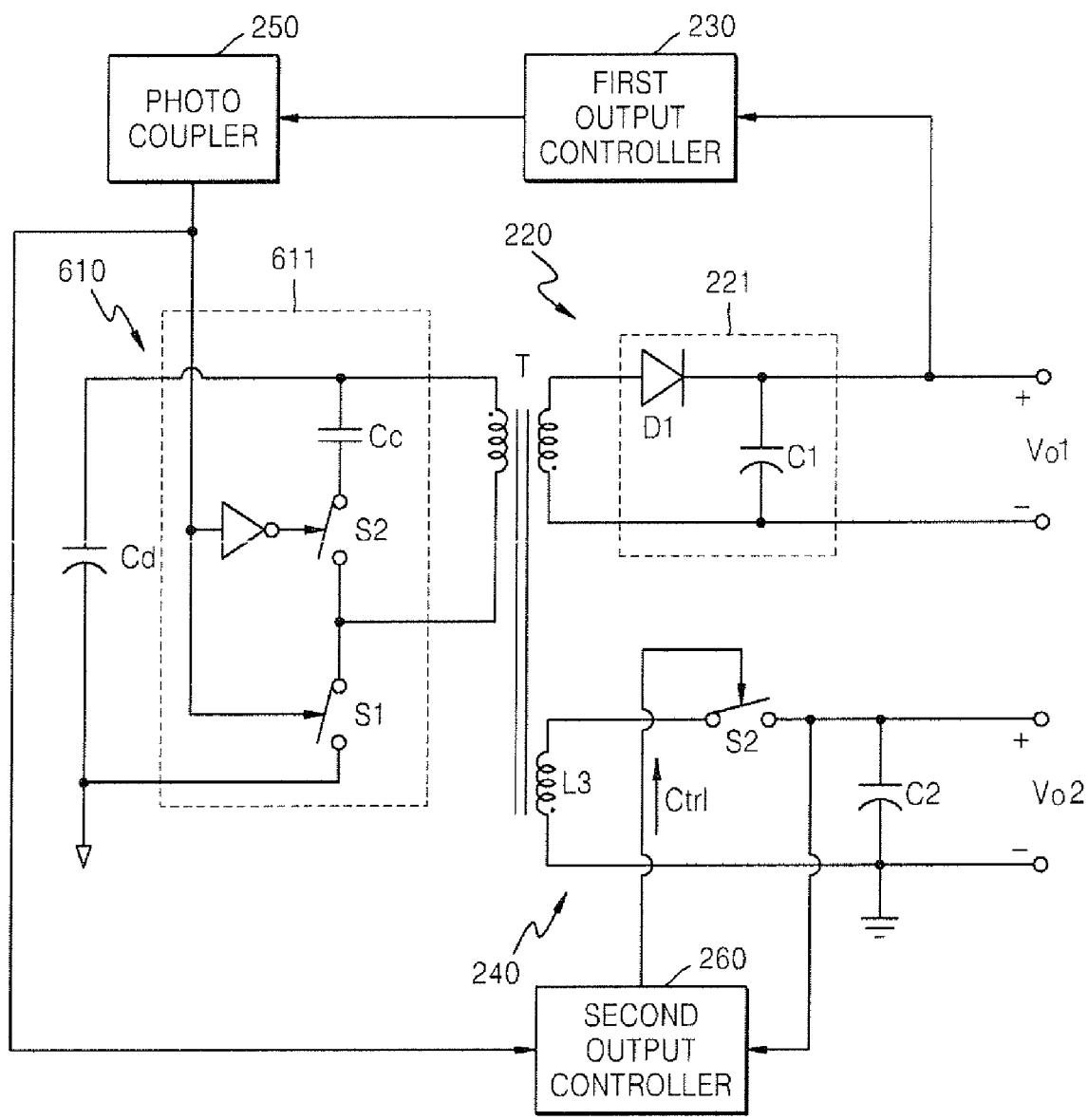
FIG. 4 is a circuit diagram explaining a power supply apparatus having multiple outputs according to another example embodiment of the present invention.

FIG. 4 is a circuit diagram explaining a power supply apparatus having multiple outputs according to another example embodiment of the present invention. Referring to FIG. 4, the current source type switching circuit unit 611 is configured to have an active-clamp flyback type circuit.

The current source type switching circuit unit 611 of a current source type power supply apparatus 610 illustrated in FIG. 4 additionally includes an active snubber circuit that prevents switching losses due to leakage inductance of the transformer T. Specifically, the current source type switching circuit unit 611 is connected in parallel to both end portions of the primary coil of the transformer T and includes a capacitor Cc and a second switch S2 that are connected in series. Here, the second switch S2 and a first switch S1 compliment each other and have a short dead time.

A second output controller 260 illustrated in FIG. 4 is the same as the second output controller 260 described with reference to FIG. 2. Therefore, a detailed description thereof is omitted here.

When the first switch S2 is turned on, energy is stored in the transformer T. Then, when the first switch S1 is turned off, the energy stored in the transformer T is transferred to secondary circuits 220 and 240. Leakage inductance of the transformer T and the energy stored in the magnetic inductance enable the first switch S1 and the second switch S2 to perform a zero voltage switching operation. In addition, while currents flow through the secondary coil of the transformer T, the capacitor Cc connected in series to the second switch S2 resonates with the leakage inductance of the transformer T.

Figure 5:
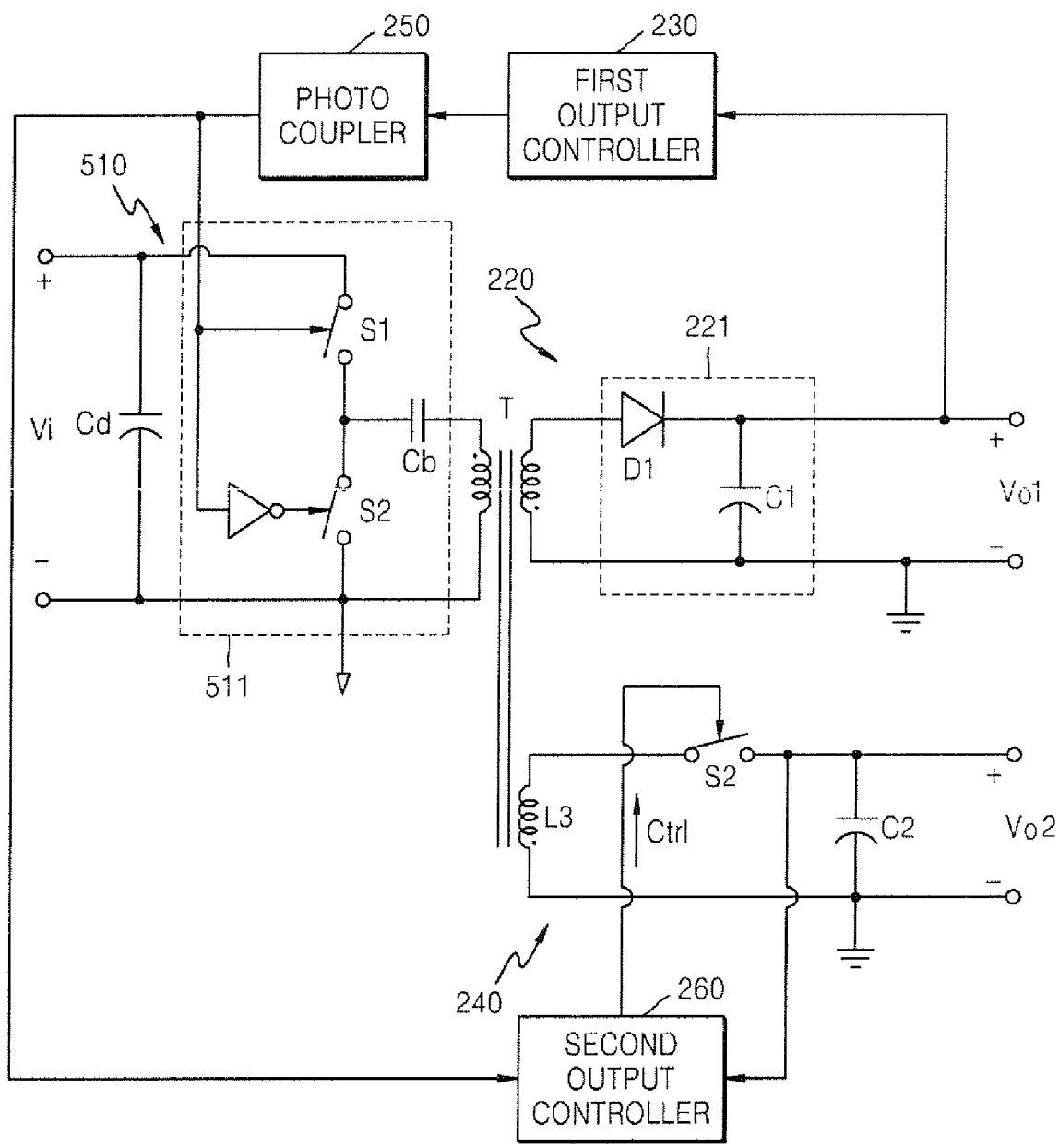
FIG. 5 is a circuit diagram explaining a power supply apparatus having multiple outputs according to yet another example embodiment of the present invention.

FIG. 5 is a circuit diagram explaining a power supply apparatus having multiple outputs according to yet another example embodiment of the present invention. Referring to FIG. 5, the current source type switching circuit unit is configured to have a half-bridge flyback type circuit.

A second output controller 260 illustrated in FIG. 5 is the same as the second output controller 260 described with reference to FIG. 2. Therefore, a detailed description thereof is omitted here.

A current source type switching circuit unit 511 of a current source type power supply apparatus 510 illustrated in FIG. 5 includes a first switch S1 and a second switch S2. Here, the first switch S1 and the second switch S2 compliment each other and have a short dead time. When the first switch S2 is turned on, energy is stored in the transformer T. Then, when the first switch S1 is turned off, the energy stored in the transformer T is transferred to secondary circuits 220 and 240.

In addition, a capacitor Cb connected in series to a primary coil of the transformer T stores or discharges energy according to a direction of current flowing through the primary coil of the transformer T, and resonates with the leakage inductance of the transformer T while current flows through a secondary coil of the transformer T.

Figure 6:
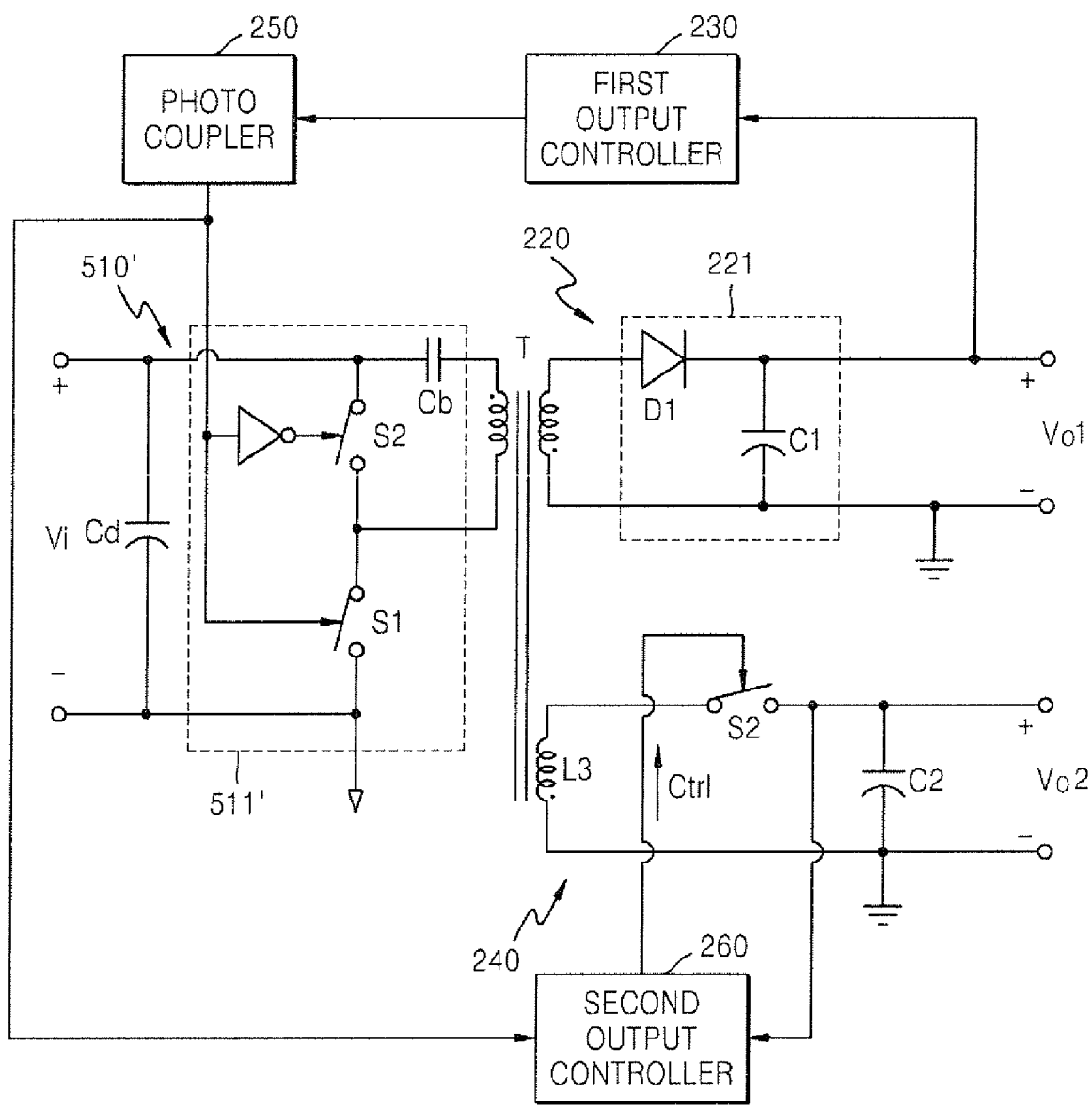
FIG. 6 is a circuit diagram illustrating another configuration that can be applied to the current source type power supply apparatus having multiple outputs illustrated in FIG. 5.

FIG. 6 is a circuit diagram illustrating another configuration that can be applied to the current source type power supply apparatus having multiple outputs illustrated in FIG. 5. A current source type switching circuit unit 511' of a primary circuit 510' illustrated in FIG. 6 has the same operations as those of the current source type switching circuit unit 511 illustrated in FIG. 5. Thus, a detailed description thereof will be omitted.

Figure 7:
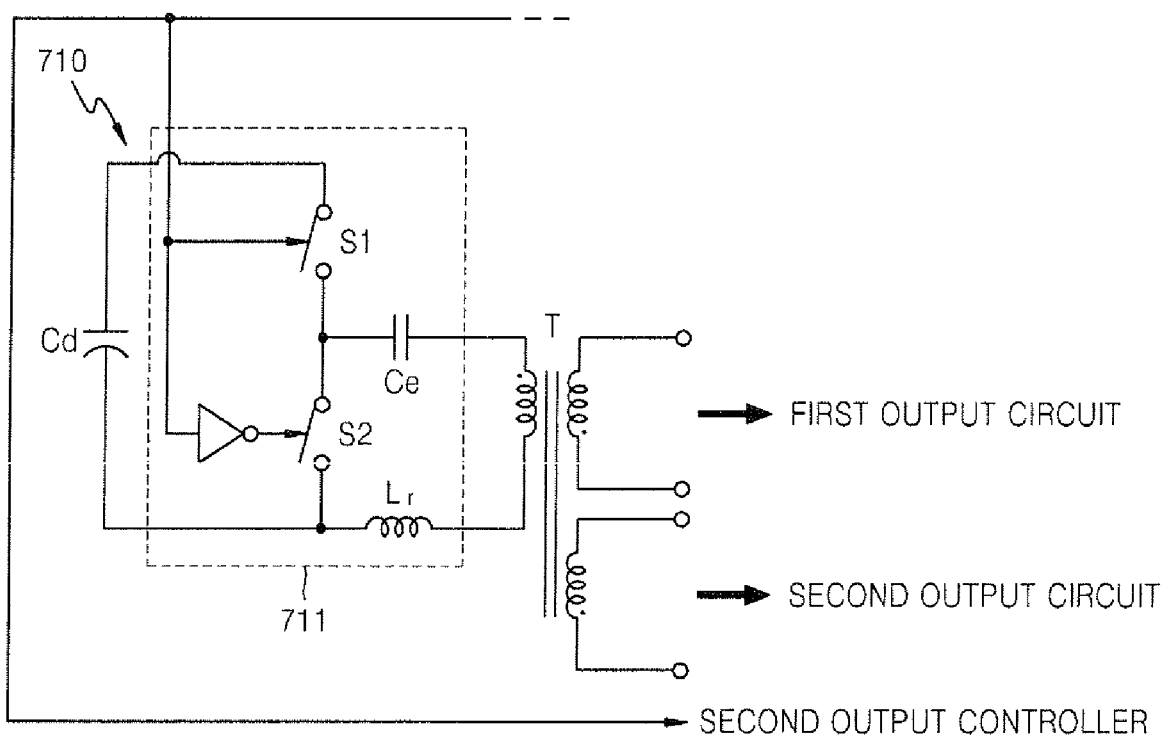
FIG. 7 is a circuit diagram explaining a power supply apparatus having multiple outputs according to another example embodiment of the present invention.

FIG. 7 is a circuit diagram explaining a power supply apparatus having multiple outputs according to another example embodiment of the present invention. In FIG. 7, a series-resonant type circuit is illustrated.

Referring to FIG. 7, a current source type switching circuit unit 711 of a primary circuit 710 includes a first switch S1 and a second switch S2. Here, the first switch S1 and the second switch S2 complement to each other and have a short dead time. In addition, the primary circuit further includes an inductor Lr connected in series to a capacitor Ce to prevent leakage inductance of the transformer T, or an inductor additionally added to the transformer T.

While the first switch S1 is in the ON state or the OFF state, the capacitor Ce and the inductor Lr resonate with each other, and energy is transferred to secondary circuits by the transformer T operated as a current source.

Figure 8:
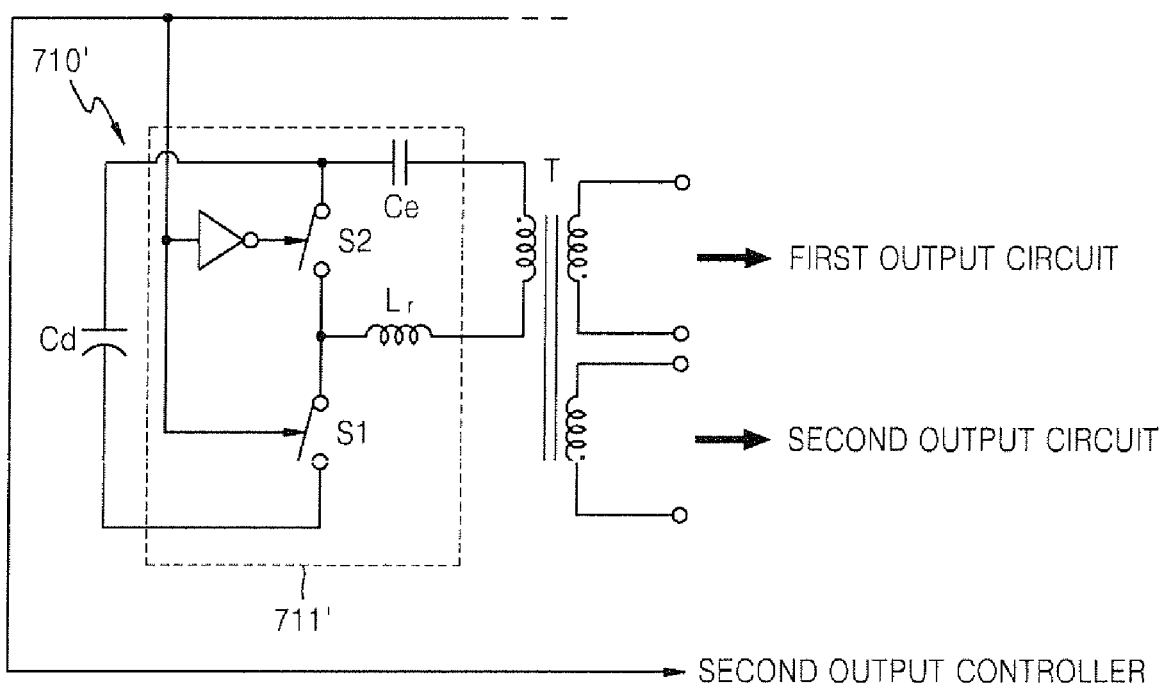
FIG. 8 is a circuit diagram illustrating another configuration that can be applied to the current source type power supply apparatus having multiple outputs illustrated in FIG. 7.

FIG. 8 is a circuit diagram illustrating another configuration that can be applied to the current source type power supply apparatus having multiple outputs illustrated in FIG. 7. A current source type switching circuit unit 711' of a primary circuit 710' illustrated in FIG. 8 has the same operations as those of the current source type switching circuit unit 711 illustrated in FIG. 7. Thus, a detailed description thereof will be omitted.

Figure 9:
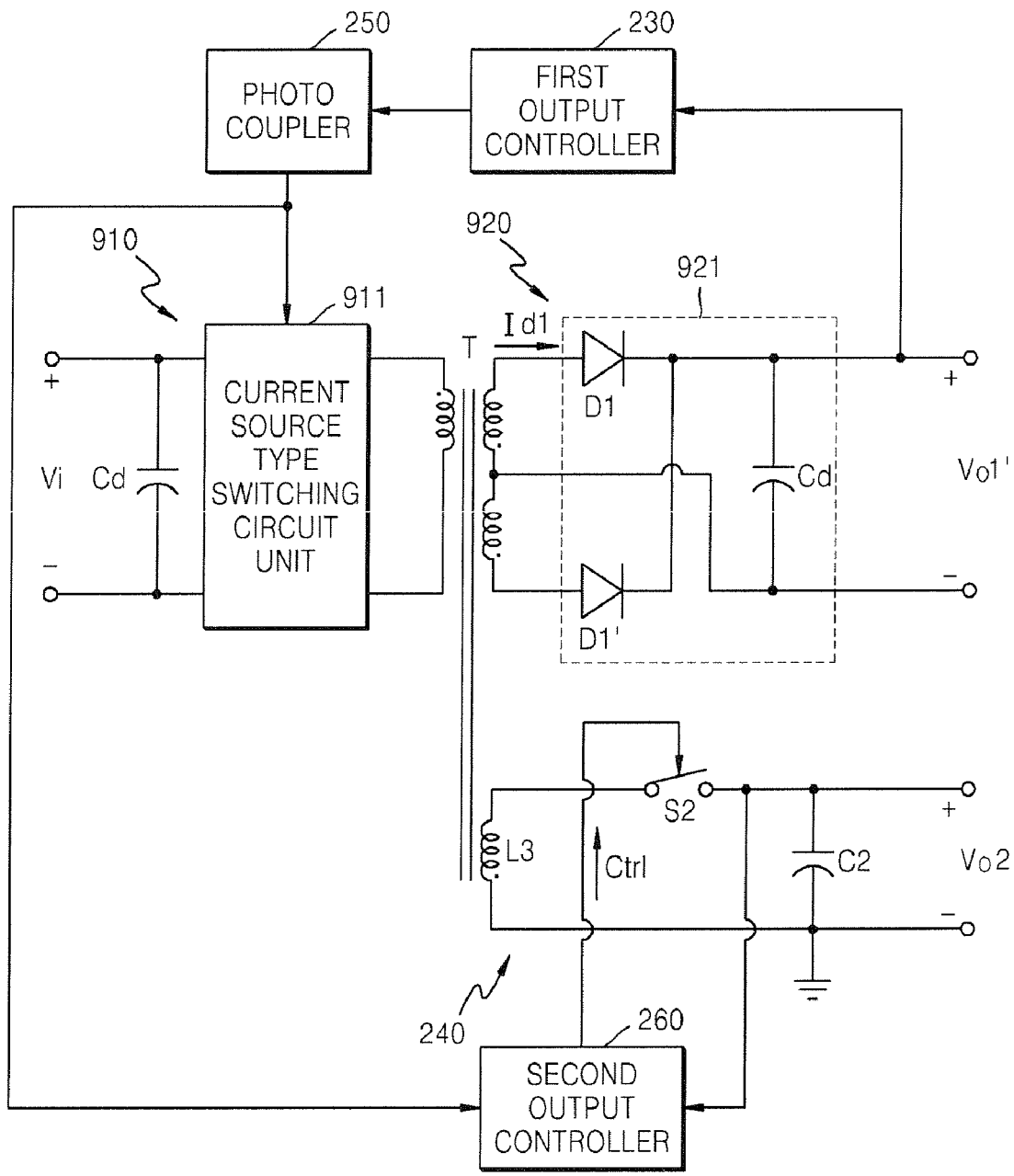
FIG. 9 is a circuit diagram explaining a power supply apparatus having multiple outputs according to yet another example embodiment of the present invention.

FIG. 9 is a circuit diagram explaining a power supply apparatus having multiple outputs according to yet another example embodiment of the present invention. Referring to FIG. 9, a first output circuit 920 includes a full-wave rectifier 921 that performs a full-wave rectifying operation.

A current source type switching circuit unit 911 of a current source type power supply apparatus 910 illustrated in FIG. 9 may be one of the types illustrated in FIGS. 2, and 4 through 8.

The first output circuit 920 includes two current paths to perform the full-wave rectifying operation on currents transferred from the transformer T. Diodes D1 and D1' are provided to the two paths, respectively. Therefore, according to a switching operation performed by the current source type switching circuit unit 911, one of the two paths is repeatedly turned on to enable the two paths to alternately perform the rectifying operation. As a result, a full-wave-rectified first output voltage Vo1' is output.

According to aspects of the present invention, there is provided a power supply apparatus having multiple outputs that can individually control a plurality of output circuits on a secondary side by using second to N-th output controllers having simple structures. In the configurations according to aspects of the present invention, the size of the power supply apparatus having multiple outputs can be reduced as compared with a conventional current source type power supply apparatus. Accordingly, as illustrated in the above described example embodiments, the sizes of circuits are significantly reduced and individual control of the output voltage is achieved.

As described above, according to aspects of the present invention, a plurality of output circuits are provided on a secondary side of a transformer T, and an output voltage of each output circuit is individually controlled. In addition, power losses are reduced and efficiency increases, a simple configuration can be implemented, and stable control of the output voltages of the multiple outputs can be achieved.

According to the aforementioned embodiments, a case where two secondary output circuits are included in the power supply apparatus is exemplified. However, it is understood by those of ordinary skill in the art that any number of secondary multiple output circuits that can be individually controlled can be implemented according to the spirit and scope of the present invention.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, more than two secondary output circuits may be included in the power supply apparatus, and the first output controller and the second output controller may be combined as one output controller. Accordingly, it is intended, therefore, that the present invention not be limited to the various example embodiments disclosed, but that the present invention includes all embodiments falling within the scope of the appended claims.

What is claimed is:

1. A power supply apparatus having multiple outputs, a transformer, a first output circuit generating a first output voltage with respect to power transferred to a secondary side of the transformer, and a first output controller generating a first control signal to control a power supply provided to a primary side of the transformer, the apparatus comprising:
    a first switch provided at the primary side of the transformer;
    a second output circuit to generate a second output voltage with respect to the power transferred to the secondary side of the transformer; and
    a second output controller to control an output of the second output voltage,
    wherein the second output circuit comprises a second switch to perform a switching operation on current flows of the second output circuit, and the second output controller controls the switching operation of the second switch by selectively turning off the second switch when the first control signal generated by the first output controller corresponds to the on state of the first switch and feeding the second output voltage back to the second switch when the first control signal generated by the first output controller corresponds to the off state of the first switch.

2. The apparatus as claimed in claim 1, wherein the second output controller turns off the second switch according to an externally applied second control signal.

3. The apparatus as claimed in claim 1, wherein:
    the second output circuit includes a capacitor connected to the second switch,
    the second switch is connected in series to the secondary side of the transformer, and
    one or more output terminals to output the second output voltage are provided at one or more end portions of the capacitor.

4. The apparatus as claimed in claim 1, wherein the second switch includes a metal-oxide-semiconductor field-effect transistor (MOSFET) having a gate terminal connected to an output terminal of the second output controller.

5. The apparatus as claimed in claim 1, wherein the second switch includes a bipolar junction transistor (BJT).

6. The apparatus as claimed in claim 1, wherein the second output controller comprises:
    an output voltage detector to detect the second output voltage; and
    an error detector to compare the second output voltage detected by the output voltage detector with a predetermined reference voltage and to output an error value according to a result of comparing the second output voltage with the predetermined reference voltage.

7. The apparatus as claimed in claim 6, wherein the second output controller further comprises:
    a pulse width modulator to output a switching control signal to control the second switch according to the first control signal.

8. The apparatus as claimed in claim 7, wherein the pulse width modulator outputs the switching control signal to turn off the second switch in response to an externally applied second control signal.

9. The apparatus as claimed in claim 6, wherein the second output controller further comprises:
    a pulse width modulator to output a switching control signal to control the second switch according to the error value output by the error detector.

10. The apparatus as claimed in claim 7, wherein the pulse width modulator outputs the switching control signal to turn on the second switch according to the first control signal and the error value output by the error detector.

11. The apparatus as claimed in claim 7, wherein the pulse width modulator outputs the switching control signal to turn off the second switch when the first control signal corresponds to an on state of the first switch.

12. The apparatus as claimed in claim 6, wherein the output voltage detector is a voltage divider circuit.

13. The apparatus as claimed in claim 6, wherein the reference voltage is generated by a resistor or a zener diode connected between a predetermined voltage source and a grounding terminal.

14. The apparatus as claimed in claim 6, wherein the second output controller further comprises a compensation circuit unit to provide a compensation circuit using negative feedback, such that the compensation circuit unit is connected in parallel to an output terminal of the error detector and an input terminal of the error detector applied with the second output voltage.

15. The apparatus as claimed in claim 14, wherein the compensation unit includes a resistor and a capacitor that are connected in series.

16. The apparatus as claimed in claim 1, wherein the primary circuit of the transformer comprises a current source type switching circuit unit including the first switch that performs a switching operation in response to the first control signal to control an energy charging operation and/or a transferring operation of the transformer.

17. The apparatus as claimed in claim 16, wherein the current source type switching circuit unit is one of a flyback type circuit, an active-clamp flyback type circuit, a half-bridge flyback type circuit, and a series-resonant type circuit.

18. The apparatus as claimed in claim 16, wherein the current source type switching circuit unit further comprises a snubber circuit to prevent leakage inductance of the transformer.

19. The apparatus as claimed in claim 1, wherein the first output circuit comprises a rectifier to rectify power transferred from the transformer.

20. The apparatus as claimed in claim 19, wherein the rectifier is one of a half-wave rectifying circuit and a full-wave rectifying circuit.

21. A power supply apparatus having a transformer and individually controlling multiple output voltages, the apparatus comprising:

a primary circuit disposed on a primary side of the transformer to perform one of an energy charging operation and a transferring operation, which transfers power to a secondary side of the transformer, in response to a first control signal;

a first switch provided at the primary side of the transformer;

a first output circuit disposed on the secondary side of the transformer to generate a first output voltage with respect to the power transferred to the secondary side of the transformer;

a second output circuit disposed on the secondary side of the transformer to generate a second output voltage with respect to the power transferred to the secondary side of the transformer, the second output circuit comprising a second switch to perform a switching operation on current flows of the second output circuit;

a first output controller to generate the first control signal and to feed the first output voltage back to the primary side of the transformer in order to apply the first control signal to the primary circuit; and a second output controller to control an output of the second output voltage by controlling the switching operation of the second switch by selectively turning off the second switch when the first control signal generated by the first output controller corresponds to the on state of the first switch and feeding the second output voltage back to the second switch when the first control signal generated by the first output controller corresponds to the off state of the first switch.

* * * * *